May 5, 1931. J. R. KOVAR ET AL 1,803,332
CULTIVATOR WITH SLED FRAME
Filed Dec. 31, 1928 2 Sheets-Sheet 2
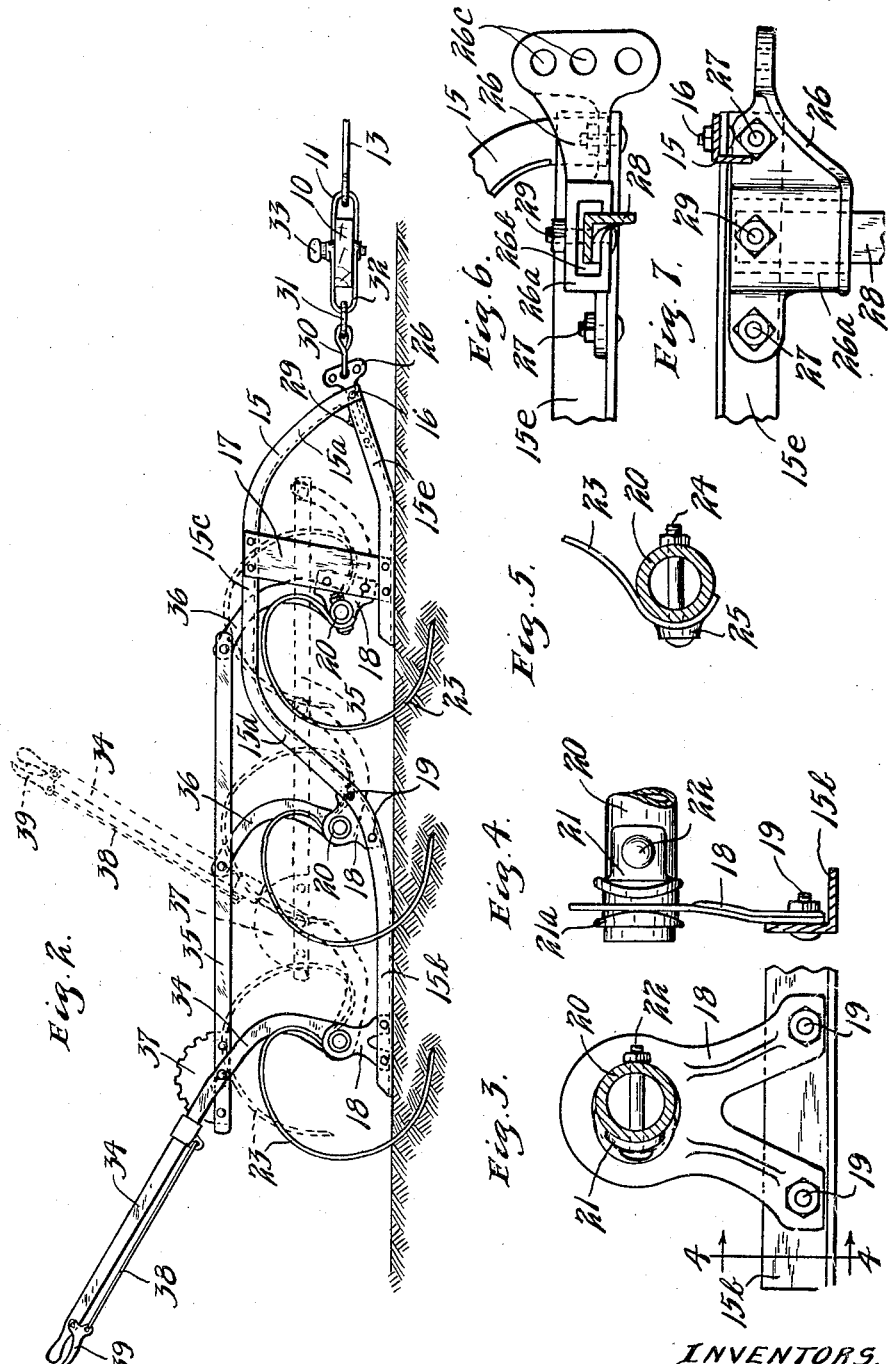
INVENTORS.
JOHN R. KOVAR.
LOUIS W. KOVAR.
BY THEIR ATTORNEYS.

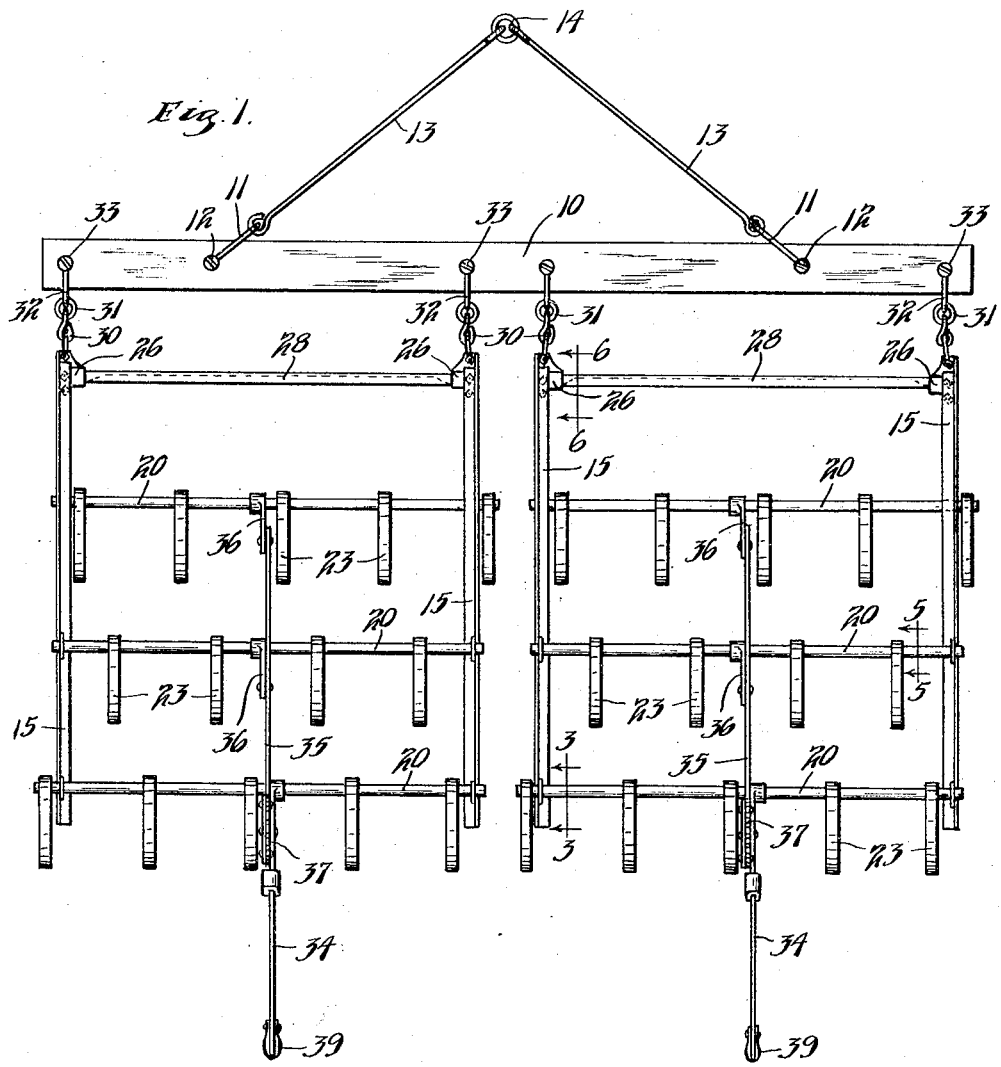

Patented May 5, 1931

1,803,332

UNITED STATES PATENT OFFICE

JOHN R. KOVAR AND LOUIS W. KOVAR, OF OWATONNA, MINNESOTA

CULTIVATOR WITH SLED FRAME

Application filed December 31, 1928. Serial No. 329,636.

This invention relates to an agricultural implement such as a cultivator or harrow and particularly to such an implement having drag bars or runners for supporting the operative parts. In harrows or cultivators having drag bars at the sides and rows of spaced teeth carried on members extending between the drag bars, the teeth are usually staggered in the various rows and some of the teeth are disposed quite close to the drag bars. It has been found in practice that where a tooth is located close to a drag bar or other part, the grass, weeds and other obstacles are apt to catch between said tooth and the drag bar or other part, thus forming an objectionable clogging.

It is an object of this invention to provide a cultivator or harrow having drag bars so constructed and arranged so that there will be no clogging between the teeth and parts in laterally adjacent vertical planes.

It is a further object of the invention to provide a cultivator or harrow having spaced drag bars, members extending therebetween and carrying rows of teeth, some of which are adjacent the drag bars, said drag bars being constructed and arranged to have portions adjacent said teeth spaced from the ground so that no clogging can occur.

It is more specifically an object of the invention to provide a spring tooth harrow having spaced drag bars or runners with parallel rock shafts extending therebetween having spaced teeth thereon, the teeth on the various rock shafts being arranged in staggered relation and the drag bars having an intermediate portion spaced well above the ground adjacent the teeth which are close to the drag bars, said drag bars having front and rear portions which are substantially horizontal and in substantial alignment.

These and other objects and advantages of the invention will be fully set forth in the following description made in connection with the accompanying drawings, in which like reference characters refer to similar parts throughout the several views, and in which:—

Fig. 1 is a plan view of the cultivator;
Fig. 2 is a view in side elevation, some parts being shown in different position in dotted lines;
Fig. 3 is a vertical section taken on line 3—3 of Fig. 1, as indicated by the arrows;
Fig. 4 is a vertical section taken on line 4—4 of Fig. 3, as indicated by the arrows;
Fig. 5 is a vertical section taken on line 5—5 of Fig. 1 as indicated by the arrows;
Fig. 6 is a vertical section taken on line 6—6 of Fig. 1 as indicated by the arrows, and
Fig. 7 is a top plan view of Fig. 6.

Referring to the drawings, a cultivator is shown having a pair of similar sections flexibly connected to a tie bar 10. The tie bar 10 is adapted to be drawn by suitable traction means and has pivotally connected thereto a pair of clevises 11 by means of the headed and nutted bolts 12. Clevises 11 are respectively engaged by eyelets at the ends of a pair of links 13, said links having eyelets at their other ends engaged in a ring 14 to which the traction means will be attached. Each of the sections of the harrow shown in Fig. 1 comprises a pair of spaced drag bars 15. These drag bars are in the form of runners and while various materials might be used for said runners, in the embodiment of the invention illustrated, they are shown as made from angle bars, one flange of which is disposed vertically. Each runner comprises a main portion 15a having a rear portion 15b substantially horizontally disposed and adapted to move in engagement with the ground. Said members 15a also comprise a substantially horizontal portion 15c spaced quite a distance above the ground and connected to portion 15b by a downwardly and rearwardly inclined portion 15d, which merges into portions 15b and 15c respectively in reverse curves. Portion 15c extends downwardly and forwardly at its front end preferably in curved form and is secured to the outer side of an auxiliary section 15e of runner 15. The runner 15e is also shown as in the form of an angle bar with one flange disposed vertically and the forward end of portion 15c is bolted to this vertical flange by the headed and nutted bolt 16, one flange of member 15a being cut away to accommodate the connection.

The auxiliary runner 15c extends downwardly and rearwardly for some distance and has a rear horizontal portion which is substantially in alignment with the rear portion 15b of main section 15a and also adapted to move in engagement with the ground. Portion 15c of the main section and the rear portion of section 15e are connected by a plate 17 bolted to the outside of member 15a and to the inside of vertical flange of member 15e. Bearing brackets 18 are bolted to the inner side of the flange of section 15a and to the inner side of plate 17 by headed and nutted bolts 19, and rock shafts 20 extend between the drag bars or runners 15 and are journaled in said brackets. Said shafts 20 have saddle plates 21 bolted thereto by the headed and nutted bolts 22, which plates have oppositely curved flanges 21a thereon of crescent or semi-cylindrical shape embracing brackets 18. It will be noted that brackets 18 have openings which are larger than rock shafts 20 and sufficiently large to accommodate the plates 21. Rock shafts 20 can thus have some vertical and lateral movement in the bearings with a very slight longitudinal movement. Flexibility is therefore provided between the runners 15 and the rock shafts 20. Rock shafts 20 have secured thereto the spaced teeth 23, said teeth being formed of resilient metal and as shown in Fig. 2, having a forward bend and an oppositely disposed rearward and substantially semi-circular bend, the ends of the teeth being pointed. Each tooth 23 is bent at its attached end to fit about rock shaft 20 and is secured thereto by a headed and nutted bolt 24, a block or shoe 25 being inserted between the head of the bolt and the tooth, said shoe having a flat outer surface and being curved to fit the curvature of the tooth at its inner side. A bracket 26 is secured to the horizontal flange of each section 15e of the runner 15 by headed and nutted bolts 27 extending through said bracket and flange. Said brackets have inwardly extending socket portions 26a having a rectangular shaped slot 26b extending therethrough in which is received the ends of a tie bar 28 which extends between said brackets and drag bars. While the bar 28 can be variously made, in the embodiment of the invention illustrated it is shown as made of an angle bar and the ends of the bar have the flanges thereof bent together in parallel relation and extending into the slot 26b and pivotally connected to bracket 26 by headed and nutted bolt 29 extending through the same and said bracket. The hole through bar 28 through which bolt 29 passes is somewhat larger than the bolt so that a flexible or loose connection is provided. Bracket 26 has a forward portion of flat form disposed in a vertical plane and having vertically spaced holes 26c therethrough. A twisted link 30 is adapted to extend through one of the holes 26c at one end and through a ring 31 at its other end, which ring also extends through the bight of a clevis 32 embracing and pivotally connected to tie bar 10 by a headed and nutted bolt 33.

The rear rock shaft 20 has secured thereto the lower end of a lever 34. Said lever is curved substantially at right angles at its lower end and has pivotally connected thereto above said curve a link 35 shown as a flat bar which link extends forwardly over the other rock shafts 20 and is pivotally connected to curved arms 36 which are secured to said other rock shafts, said arms as shown in Fig. 2 curving upwardly and rearwardly when the teeth are in operative position. A toothed segment 37 is rigidly secured to link 35 having its center substantially at the pivot of lever 34 and said lever has a spring-operated pawl adapted to seat between the teeth of segment 37, said pawl being connected by the rod 38 to the usual pawl operating grip handle 39 at the end of said lever. It will be noted that bar 35 is spaced above teeth 23 when the latter are in operative position even though some of said teeth are in vertical planes adjacent the vertical plane of said bar.

In operation the harrow will be drawn over the ground by a traction means connected to ring 14. When the device is not operating lever 34 will be swung forwardly about the rear rock shaft to the position shown in dotted lines in Fig. 2. This rotates rock shafts 20 and swings teeth 23 upwardly out of contact with the ground, all of said rock shafts being oscillated by link 35 and arms 36. When the teeth are to be moved to operative position, lever 34 is swung rearwardly as shown in full lines in Fig. 2 and held in the desired position by the locking of lever 34 to segment 37. The teeth 23 being in staggered relation, some of these teeth engage the ground at a point close to the drag bars 15, these particular teeth as shown in Fig. 1 being on the front rock shaft 20. It will be noted, however, that where these teeth are disposed close to the drag bar, the drag bar is spaced well above the ground at the portion 15c thereof, the distance above the ground being substantially the same as the diameter of the curve of tooth 23. There is no small space formed, therefore, between the side of the tooth 23 and the drag bar 15 and there can be no clogging of material between the tooth and drag bar. There is a perfectly free space at the side of the tooth. The other teeth are spaced sufficiently from the drag bar to prevent clogging and the outside teeth on the rear rock shaft engage the ground at a point in the rear of the drag bar so that no clogging can occur at this point. Space is also provided between bar 35 and the teeth in adjacent vertical planes due to the elevation of said bar by the long curved arms 36. No clogging can therefore occur between bar 35 and the adjacent teeth. A structure is therefore provided in which there is no tendency whatever for material to clog between the teeth and the drag bars.

From the above description it is seen that applicant has provided a simple and efficient structure of harrow or cultivator so arranged that the desirable drag bar action is had and at the same time there will be no clogging of material between the teeth and drag bars or other parts. At the same time the drag bars are strong and durable and of simple and inexpensive construction and all necessary movements of the parts are provided for. The device has been amply demonstrated in actual practice and found to be very successful and efficient.

It will, of course, be understood that various changes may be made in the form, details, proportions and arrangement of the parts without departing from the scope of applicant's invention, which, generally stated, consists in a device capable of carrying out the objects above set forth, in the novel parts and combination of parts disclosed and defined in the appended claims.

What is claimed is:—

1. A cultivator having in combination, a drag bar, having engagement with the ground to support said cultivator, a rock shaft journaled in said bar and extending laterally therefrom, a tooth carried on said rock shaft and disposed in a plane in close proximity to the vertical plane of said drag bar, said drag bar adjacent said tooth being positioned well above the ground and adjacent the top of said tooth in all operative positions of said tooth whereby no space is formed horizontally between said bar and tooth.

2. A cultivator having in combination, a pair of drag bars moving in contact with the ground and adapted to support the cultivator in operative position, members extending between and carried by said drag bars, teeth carried by and spaced along said members and held at a certain height by said drag bars, some of which teeth are adjacent said drag bars, said drag bars having raised portions spaced above the ground and respectively disposed adjacent the teeth which are close to said drag bars whereby an open space is formed laterally of said tooth toward the plane of said drag bar and clogging between said tooth and drag bar is prevented.

3. A cultivator having in combination, rows of laterally spaced teeth, transversely extending bars carrying said teeth, a pair of laterally spaced drag bars to which said bars are connected, said drag bars moving in contact with the ground and holding said teeth in certain positions relative to the ground when operating, some of said teeth being disposed in vertical planes closely adjacent the vertical planes of said drag bars, said drag bars having front and rear portions engaging the ground and intermediate portions spaced above the ground and respectively disposed adjacent said last mentioned teeth whose vertical planes are close to the vertical planes of said drag bars.

4. A cultivator having in combination, a pair of drag bars each having a lower auxiliary section at its forward end and a rearwardly extending main section comprising a front portion secured at its front end to said auxiliary section extending upwardly therefrom and having an intermediate portion spaced a considerable distance above the ground and then extending downwardly and rearwardly, and having a rear portion in engagement with the ground, said drag bars engaging the ground when said cultivator is in operative position, a tooth disposed in a vertical plane adjacent the vertical plane of each drag bar at said intermediate portion thereof, said tooth being held in definite relation to the ground by said drag bar when said cultivator is operating.

5. A cultivator having in combination, a pair of drag bars each having a main section having a rear horizontal portion adapted to move in engagement with the ground when the cultivator is operating, an intermediate portion spaced above the ground and extending downwardly at its forward end, and an auxiliary section secured to said forward end and extending rearwardly a short distance therefrom in horizontal position substantially aligned with said first mentioned rear horizontal portion of said main section, and also adapted to move in engagement with the ground when said cultivator is operating and a tooth disposed laterally adjacent said intermediate portion and held in definite relation to the ground by said drag bar.

6. A cultivator having in combination, rows of laterally spaced teeth, transversely extending bars carrying said teeth, a pair of laterally spaced drag bars to which said first mentioned bars are secured, said drag bars extending continuously longitudinally of said cultivator and adapted to move in engagement with the ground when said cultivator is operating to hold said teeth in different positions relatively to the ground, the vertical plane of one tooth being in close proximity to the vertical plane of one drag bar, said drag bar having a portion extending well above the ground adjacent said tooth whereby an open space is formed adjacent said tooth and clogging between said tooth and drag bar is prevented.

In testimony whereof they affix their signatures.

JOHN R. KOVAR.
LOUIS W. KOVAR.